Patented Mar. 12, 1946

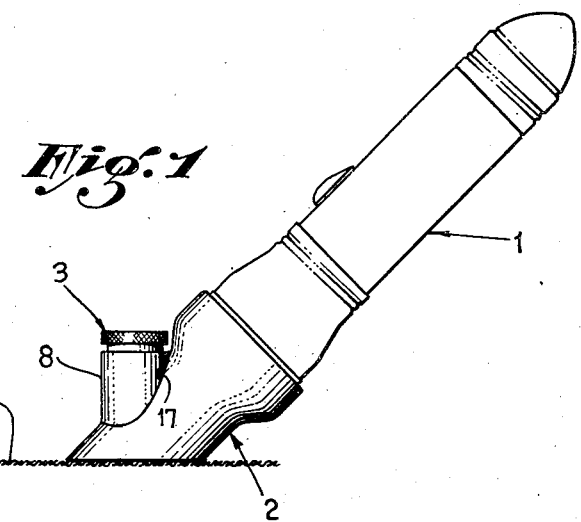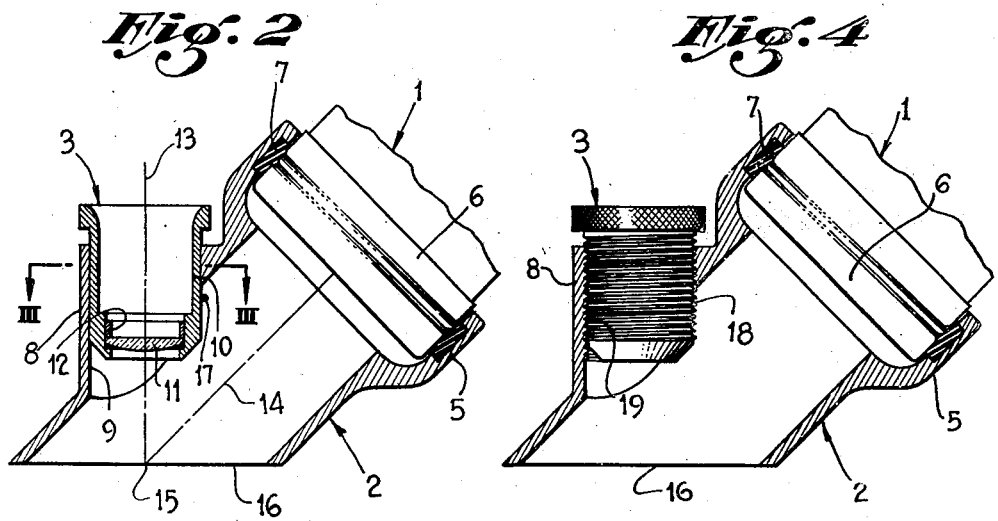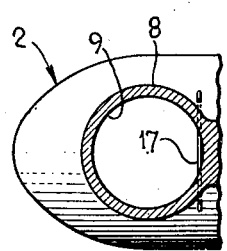

2,396,440

UNITED STATES PATENT OFFICE 2,396,440

INSPECTION LIGHT

Benjamin F. Schmidt, Los Angeles, Calif.

Application September 2, 1944, Serial No. 552,431

1 Claim. (Cl. 88—39)

My invention relates to an inspection light and has particular reference to a device which finds particular utility when employed in the inspection of samples of minerals, textiles or machined surfaces.

In certain industries and occupations, it is oftentimes necessary to make a visual inspection or examination of textiles, minerals or machine surfaces under circumstances which prevent the object to be inspected from being removed to a properly equipped laboratory. Under these circumstances it is, of course, necessary to make the inspection at the location of the object and since such inspections oftentimes require the use of visual aids such as magnifiers or simple microscopes, they must of necessity be made under conditions which are somewhat adverse to a complete and adequate inspection. One of the principal difficulties attendant upon examinations of this type lies in the lack of sufficient light and in the lack of properly directed light. Also, if there is sufficient light, it is usually a general illumination with the result that the brightly lighted background reduces the visual contrast, hampering the magnefication examination and producing rapid visual fatigue. Also, when a simple microscope is used, great difficulty is encountered in the holding of the microscope at the proper distance to maintain the object in critically sharp focus.

It is, therefore, an object of my invention to provide an inspection light which overcomes the above noted disadvantages by mounting a light source and a simple microscope on a single support.

It is also an object of my invention to provide a device of the character set forth in the preceding paragraph in which the support serves as a shield to intercept the spill light and prevent undue illumination of the general background.

It is an additional object of my invention to provide a device of the character set forth in the preceding paragraphs which includes a light source for directing a high intensity beam of light across the field of the microscope to brilliantly illuminate an object or sample placed in said field.

It is a still further object of my invention to provide a device of the character hereinbefore referred to in which the microscope is mounted upon the shield for focusing adjustment.

It is also an object of my invention to provide a device of the character set forth in the preceding paragraphs in which the light beam axis and the optical axis of the microscope are angularly disposed to intersect at the focal plane of the microscope, the microscope being out of the light beam to permit the light source to be used as a source of local illumination for conventional purposes.

It is a still further object of my invention to provide a device of the character set forth hereinbefore in which the shield is terminated along a plane perpendicular to the optical axis of the microscope and passing through the intersection of the optical axis and the axis of the light beam, whereby the microscope may be held stationary in the proper location relative to the object being inspected by placing the shield directly on the surface to be examined.

It is an additional object of my invention to provide an attachment device for an electric torch or hand flash light which includes a light shield and a simple microscope arranged as described in the preceding paragraphs and in which means is provided for detachably securing the shield to the end of said electric torch.

Other objects and advantages of my invention will be apparent from a study of the following specifications, read in connection with the accompanying drawing, wherein:

Fig. 1 is a side elevational view of the preferred embodiment of my invention showing the relative disposition of the parts and its manner of use;

Fig. 2 is an enlarged longitudinal sectional view showing the details of construction and one way in which the microscope may be mounted for focusing adjustment;

Fig. 3 is a fragmentary sectional view taken along the line III—III of Fig. 2 and showing additional details of construction; and Fig. 4 is a view similar to Fig. 3 but showing a modified arrangement for mounting the microscope for focusing adjustment.

Referring to the drawing, I have illustrated in Fig. 1 the inspection light of my invention as including a light source indicated generally at 1 carrying a light shield shown generally at 2 upon which is mounted a simple microscope shown generally at 3, the parts being so arranged that light produced by the source 1 is directed against a sample to be inspected as, for example, a sample of textile 4 when that sample is placed in a position to be viewed through the microscope 3.

The construction is shown in greater detail in Fig. 2 in which the shield 2 is seen to consist of a section of tubing which is enlarged as shown at 5 to pass over the light emitting end 6 of the light source 1.

In the drawing the light source 1 has been illustrated as comprising an electric torch or hand flash light of conventional design. The device shown in Fig. 2 is intended as an attachment device and the enlarged diameter portion 5 carries a resilient ring 7 preferably formed of rubber or like material. The diameter of portion 5 is adjusted to closely receive the end 6 of the electric torch 1 and the rubber ring 7 serves to frictionally interengage the shield 2 with the torch 1 to hold the shield in place as shown in Fig. 1.

The enlarged portion 5 is symmetrically disposed relative to the shield 2 so that when the parts are assembled as shown in Fig. 2, the axis of the tubing is concentric with the axis of the light beam emitted from the end 6.

From the upper side of the shield 2 there is provided a cylindrical boss 8 which is bored as shown at 9 to receive the simple microscope or magnifier 3 which, as is shown in Fig. 2 may include a tubular portion 10 mounting at its lower end a magnifying lens 11 secured as by means of a lock ring 12.

The microscope 3 is so positioned that its optical axis (represented by the line bearing the reference character 13) intersects the axis 14 of the shield 2 at a point marked 15. The parts are also so adjusted that when the microscope is positioned as shown in Fig. 2, the point 15 will be substantially in focus to a person looking through the microscope. The bottom end of the shield 2 is cut along a plane 16 which is inclined to the tubing axis 14 at such angle and at such location as to pass the plane 16 through the point 15 at right angles to the optical axis 13. With the parts so arranged, the device may be placed on the sample 4 to be inspected as is shown in Fig. 1 and the center of the in-focus field of the microscope 3 will then coincide with the center of the light beam emitted from the light source end 6, and by placing the device directly on the sample as shown in Fig. 1, the sample may be caused to occupy the focal plane of the microscope 3.

For adjustment purposes, the tubing portion 10 of the microscope 3 is slidably mounted within the bore 9 to permit its being moved axially to adjust the focus of the image.

To hold the device in an adjusted position, I may use a friction device comprising a transversely extending length of spring wire 17 (Fig. 2) passed through suitable bores in the shield 2 and forming a chord of the circular cross section of the bore 9. The spring 17 is deflected radially as is shown in Fig. 2 when the microscope 3 is inserted and serves to frictionally hold the microscope against movement within the bore 9.

As an alternative focusing arrangement, the outer surface of the sleeve 10 may be threaded as shown at 18 in Fig. 4 to cooperate with similar female threads 19 formed within the bore 9. With such an arrangement the device is focused merely by rotating the microscope 3.

While I have described the preferred embodiment of my invention as comprising an attachment device employing the rubber ring 7 to secure the device to a conventional electric torch, it is to be understood that the device may comprise a unitary assembly of light source and shield, in which event the shield 2 is permanently secured to a light source of suitable design.

It will be noted from the foregoing that the microscope is so positioned as to be out of the direct beam of light emitted by the light source so that when the device is not in use as an inspection light requiring use of the microscope 3, it may be used as a source of local illumination in the manner common to electric torches and hand flash lights.

It will also be noted that by so arranging the parts as to cause the light beam axis and the optical axis of the microscope to intersect at the point 15, and by cutting the shield 2 along a plane passing through the point 15 and perpendicular to the axis 12, I insure adequate illumination of the object to be inspected and insure proper positioning of the object with respect to the microscope by merely placing the plane surface 16 upon the surface to be inspected.

While I have shown and described the preferred embodiment of my invention, I do not desire to be limited to any of the details of construction shown or described, except as defined in the appended claim.

I claim:

In an attachment device for an electric torch including a circular end from which a light beam is emitted, the combination of: a tubular light shield; attachment means on said shield for receiving said end of said electric torch; means on said attachment means for frictionally engaging said end of said electric torch for detachably securing said light shield to said end; a simple microscope; a supporting member on said shield defining a bore for slidably receiving said microscope, said bore being directed to extend the optical axis of said microscope at an angle to and intersecting the axis of said tubular shield; and a spring in said bore for engaging said microscope to frictionally hold the same in any adjusted position in which it may be placed, said tubular shield being terminated along a plane disposed at right angles to said optical axis and passing through the point of intersection of said axis with the axis of said tubular shield.

BENJAMIN F. SCHMIDT.